United States Patent [19]

Johnson

[11] Patent Number: 4,701,039

[45] Date of Patent: Oct. 20, 1987

[54] COPY ACCESSORY FOR INSTANT CAMERA

[75] Inventor: Bruce K. Johnson, Andover, Mass.

[73] Assignee: Polaroid Corporation, Cambridge, Mass.

[21] Appl. No.: 793,985

[22] Filed: Nov. 1, 1985

[51] Int. Cl.⁴ .................... G03B 15/03; G03B 17/50; G03B 27/54

[52] U.S. Cl. .................... 354/80; 354/86; 354/126; 354/149.11; 355/21; 355/27; 355/67

[58] Field of Search ............ 354/80, 81, 83, 84, 354/85, 86, 126, 145.1, 145.11, 62, 293; 355/21, 27, 39, 43, 45, 67, 70

[56] References Cited

U.S. PATENT DOCUMENTS

| | | | |
|---|---|---|---|
| 2,866,380 | 12/1958 | Bing et al. | 355/21 |
| 3,065,667 | 11/1962 | Edgerton | 355/27 |
| 3,143,949 | 8/1964 | Cooper, Jr. et al. | 355/107 |
| 3,263,584 | 8/1966 | Knus | 355/67 |
| 3,388,645 | 6/1968 | Sullivan | 354/62 |
| 3,424,070 | 1/1969 | Nyman | 354/62 |
| 3,479,937 | 11/1969 | Sullivan | 354/62 |
| 3,514,206 | 5/1970 | Harvey et al. | 354/126 |
| 3,653,760 | 4/1972 | Johnson | 355/39 |
| 3,697,175 | 10/1972 | Sullivan | 355/39 |
| 3,709,119 | 1/1973 | Van Der Meer | 354/81 |
| 4,121,232 | 10/1978 | Jones | 354/126 |
| 4,145,138 | 3/1979 | Mercure | 355/29 |
| 4,200,392 | 4/1980 | Svatek | 355/45 |
| 4,300,827 | 11/1981 | Baker | 354/293 |
| 4,526,444 | 7/1985 | Fantone et al. | 354/225 |

Primary Examiner—A. A. Mathews
Attorney, Agent, or Firm—Leslie J. Payne

[57] ABSTRACT

There is disclosed an accessory for use with a camera of the instant developing kind which converts the camera into a photocopying camera. The accessory includes means for insuring even illumination of the area to be photographed as well as for insuring that the exposure and focusing functions of the camera operate in such a manner so as to provide suitable photocopy results.

16 Claims, 9 Drawing Figures

COPY ACCESSORY FOR INSTANT CAMERA

BACKGROUND OF THE INVENTION

The present invention relates generally to a photographic copying accessory and, more particularly, one which is adaptable for use with photographic apparatus of the self-developing type for providing photographic reproductions of photographic prints and the like.

For obtaining copies of positive prints, a person normally submits the prints to a retail store which then forwards them to a commercial photocopying concern. At such a concern, the requisite number of copies are made and the prints and copies thereof are returned ultimately to the customer. This process is relatively time consuming and relatively inconvenient inasmuch as it requires numerous customer trips to and from the store.

Various kinds of apparatus exist which facilitate the copying of photographic prints or other generally planar image bearing material. For achieving commercial success with such apparatus, it is generally desirable to obtain relatively high quality photographic reproductions in the least expensive manner.

One type is characterized by a camera enclosed permanently within the photocopying apparatus. Of course, this type tends to be relatively expensive and the attendant high cost factor is a significant drawback in the amateur camera market. Aside from this drawback, such a photocopying apparatus is relatively heavy and more cumbersome to use than is otherwise desirable. Furthermore, there is provided a separate artificial illumination system which must be compatible with the camera used. Examples of such kinds of apparatus are disclosed in U.S. Pat. Nos. 3,065,667; 4,200,392; and 4,300,827.

Another type of amateur photocopying apparatus is an accessory which releasably cooperates with a camera itself. These accessories provide a less expensive alternative than the type of apparatus noted previously. Such accessories when coupled with cameras of the instant developing type facilitate reproduction of prints in a relatively quick and easy manner. For instance, accessories of the type noted are generally described in U.S. Pat. Nos. 2,866,380, 3,697,175 and 3,653,760. For these accessories to function in a manner which provides acceptable prints, they must provide proper exposure in a manner which allows faithfull reproduction of the prints. For copying reflection type prints, such as described in the first two patents, an internal source of artificial illumination is provided in the accessory itself. This is, of course, an added expense. For copying transparencies the light source of the camera is utilized, such as described in the last noted patent.

The last noted group of accessories are also limited insofar as they are not used in conjunction with cameras having automatic ranging systems and, fill flash exposure systems, such as that described in commonly assigned U.S. Pat. No. 4,526,444.

SUMMARY OF THE INVENTION

In accordance with the present invention, there is provided an improved photographic accessory. This accessory is for use with photographic apparatus of the self-developing kind, especially the more sophisticated versions.

Essentially, there is provided an accessory for use with photographic apparatus of the instant developing type. This accessory is for photographically copying objects, particularly photographic prints, with reflected light by a photographic apparatus using its own source of artificial illumination.

In an illustrated embodiment, the accessory comprises a housing assembly and mounted on the assembly is a lens assembly. The housing assembly has means for defining an aperture which is within the field of view of the lens assembly and within which is positioned the object to be photographically copied. The lens assembly provides a preselected image size-subject size ratio so that it can properly size the image of the subject at the assembly aperture to the image area of the film format used in the photographic apparatus. The housing assembly includes means for removably receiving and supporting the camera such that the taking lens of the camera and the lens assembly are substantially optically coaxial. Means are provided for functionally interfacing with the exposure control means of the camera and the lens assembly. For illuminating the object to be copied there is provided an illuminating means which serves to define light paths such so that the object can be illuminated evenly by the illuminating source of the photographic apparatus.

In a preferred embodiment the illuminating means includes a system of mirrors which are arranged with respect to each other and the source of illumination so that the object to be photographed is generally uniformly illuminated by such source.

In another illustrated embodiment the interfacing assembly includes optical means associated therewith which divert a portion of the illumination from the camera source to the exposure control system of the camera. This optical means is arranged so as to increase termination of exposure by the automatic exposure control means. This provides a better exposure of the object being copied. In such embodiment, the optical means is comprised of a generally elongated optical member having surfaces arranged to transmit light by total internal reflection between the source of artificial illumination and the exposure control means.

In another illustrated embodiment the optical accessory includes a sonar window which receives in overlying relationship thereto the sonar transducer of the photographic apparatus. Such window facilitates automatic focusing of the taking lens system to its nearest focusing position. The housing assembly also includes means for redirecting the sonar energy so as to avoid having the energy creating an interference pattern that could contribute to range misinformation.

In another illustrated embodiment the housing is provided with a movable top cover. The top cover is movable between a closed position and an open position. When in the closed position the cover covers the lens assembly, the illuminating cooperating means as well as the interfacing means. When in the open position the cover allows the photographic apparatus to be supported in fixed relationship to the interfacing means and at the same time assist in properly maintaining the photographic apparatus such that its taking lens is optically coincident with the lens assembly.

Among the other objects of the invention are therefore, the provision of an accessory for use with a photographic camera of the instant developing type which converts the apparatus into a copying camera; the provision of an accessory which facilitates easy and correct installational mounting of the photographic apparatus;

the provision of an accessory of the above type which is inexpensive and easily operated insofar as there are no operator steps necessary other than mounting and shooting; the provision of an accessory of the foregoing type which is compact and portable; the provision of an accessory for a photographic apparatus of the above type which is simple and easy to fabricate; and, the provision of an accessory apparatus for use with a photographic apparatus of the above type which takes reflection type photographs using the illumination source of the photographic apparatus.

The above and other objects and further scope of applicability of the present invention will become apparent with the following detailed description when read in conjunction with the accompanying drawings wherein like reference numerals indicate like structure throughout the several views.

BRIEF DESCRIPTION OF THE DRAWINGS

FIG. 8 is a bottom view of the accessory of the present invention with a photographic print mounted therein; and, FIG. 9 is a perspective view of the photographic apparatus for which the photographic accessory of the present invention is fabricated to cooperate with.

DETAILED DESCRIPTION

Figure 1:
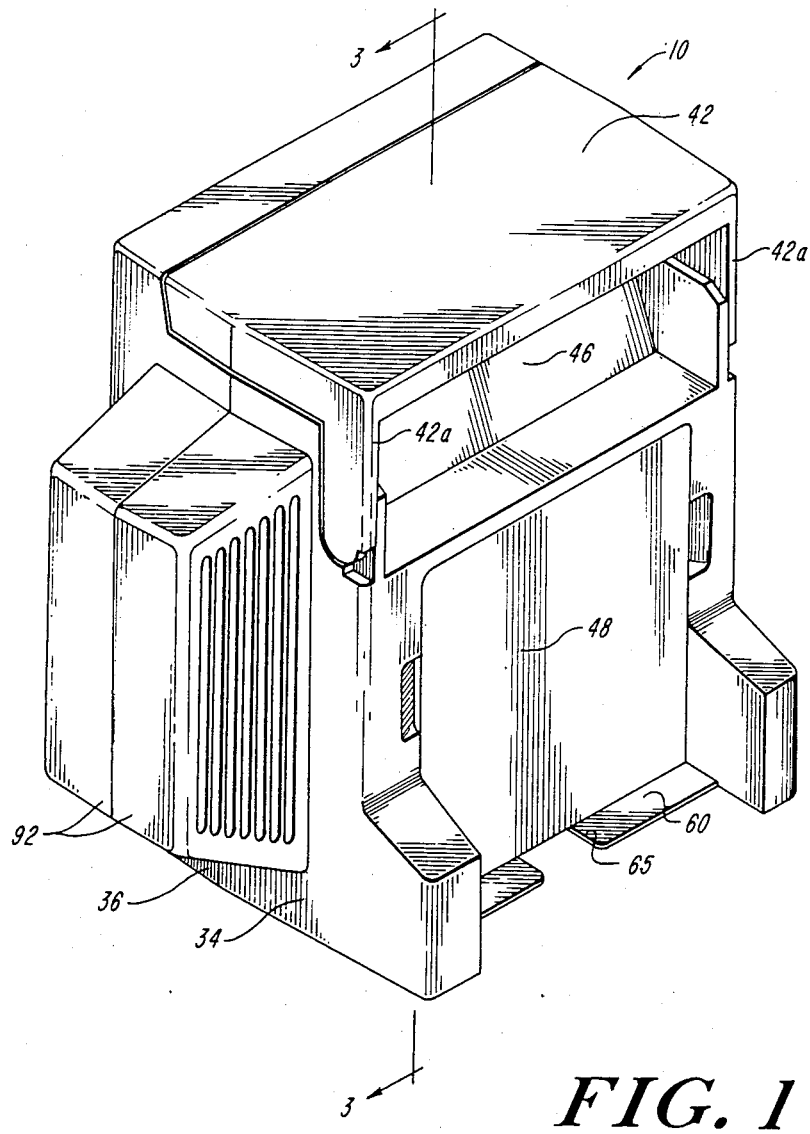
FIG. 1 is a perspective view of a photographic accessory made in accordance with the principles of the present invention and shown in a closed condition.

Reference is made initially to FIGS. 1-8 which depict the improved photographic accessory of the present invention designated generally by reference numeral 10. The accessory 10 is adapted to be easily and inexpensively fabricated from moldable plastic.

The accessory 10 is adapted for use particularly with a self-developing camera 12 of the type generally described in commonly-assigned U.S. Pat. No. 4,526,444 and shown better in FIG. 9.

Inasmuch as the camera 12 does not, per se, form an aspect of the present invention a detailed description thereof will be omitted. However, those portions of the camera which are necessary for purposes of understanding and describing the photographic accessory 10 will be set forth.

Figure 9:
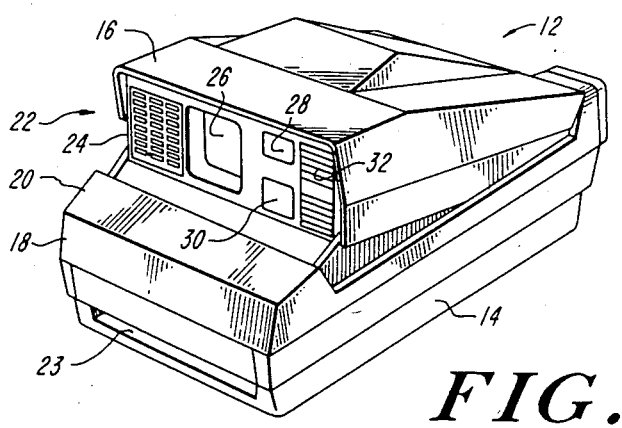

The camera 12 is best shown in FIG. 9 and basically, includes a first housing portion 14 and a second housing portion 16, the latter of which has one end attached pivotally to the former. The first housing portion 14 has a leading end wall 18 which includes an outwardly and rearwardly slanting portion 20. The slanting portion 20 terminates before a component module 22 of the camera, the latter of which is mounted on the second housing portion 16. An elongated exit slot 23 extends along the width of the leading wall 18 and, of course, provides an exit for the photographic film unit after each unit is ejected from the camera 12 by a film advancing means (not shown).

As best shown in FIG. 9, the front face of the module includes a sonar-type range finder 24, a taking lens assembly 26, a photocell assembly 28, a viewfinder window 30 and a source of artificial illumination, such as electronic strobe 32.

Reference is now made back to the photographic copy accessory 10 and, in particular, to FIGS. 1-4, and 8. As shown the copy accessory 10 includes front and back housing portions 34 and 36; respectively. The front and back portions 34 and 36 are interconnected at the top by an interface plate or assembly 38 and at the bottom by a base assembly 40.

Figure 2:
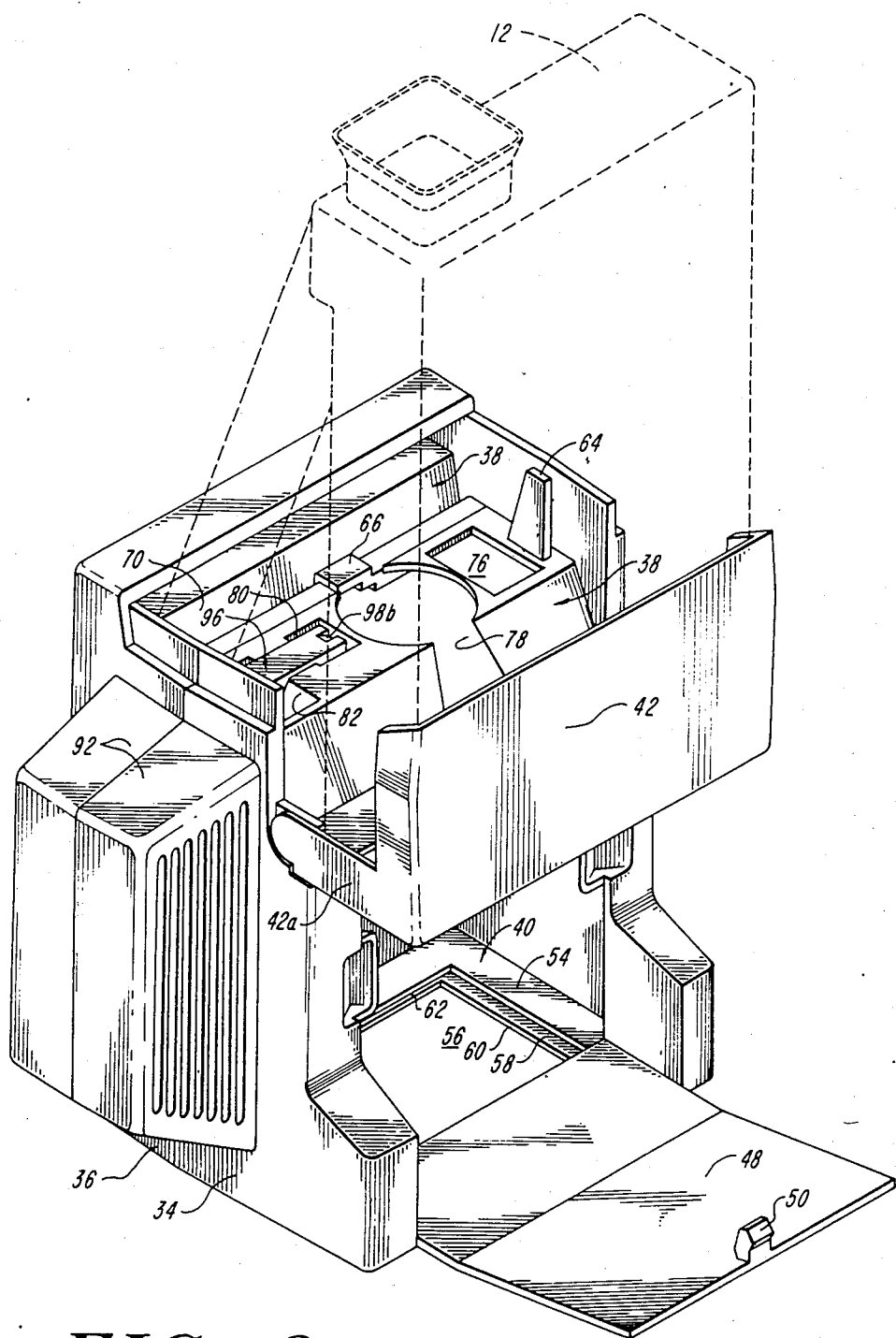
FIG. 2 is a perspective view showing the photographic accessory in an open position wherein a photographic apparatus of the instant developing type is mounted therein.
Figure 3:
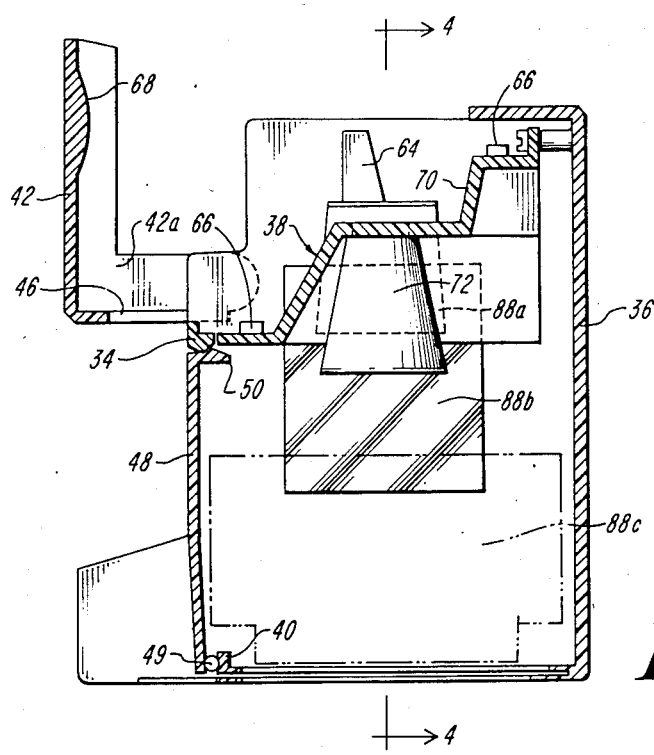
FIG. 3 is a cross-sectional view taken along section line 3-3 appearing in FIG. 1 and looking in the direction of the arrows.

A top cover 42 is suitably pivotally mounted by arms 42a to the front stand 34. The top cover 42 is movable between a closed position, such as shown in FIG. 1 and an open position, such as shown in FIGS. 2 and 3. When in the former position, the cover 42 essentially covers the interface plate 38. When the top cover 42 is in its open or operative condition it serves to not only properly maintain the camera 12 in a desired stable orientation, but facilitates passage of the film unit 44 (FIG. 5) from the camera 12 following completion of a photocopying cycle. In this latter regard, it will be noted that the cover 42 is formed such that a space 46 extends along the length of the exit slot 23 when the cover is erect. Accordingly, the film unit upon exiting the exit slot 23 can fall downwardly therefrom.

Figure 6:
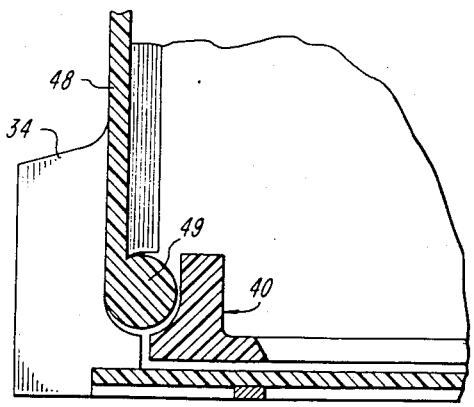
FIG. 6 is an enlarged fragmentary view showing in cross section certain components of the housing assembly of the photographic accessory.
Figure 7:
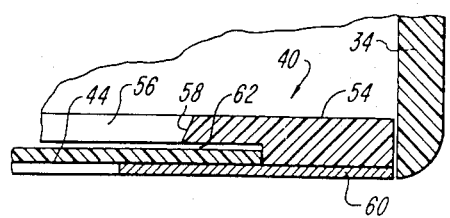
FIG. 7 is another enlarged fragmentary view showing in cross section certain features of the present accessory which receive and position the photographic print to be copied.
Figure 8:
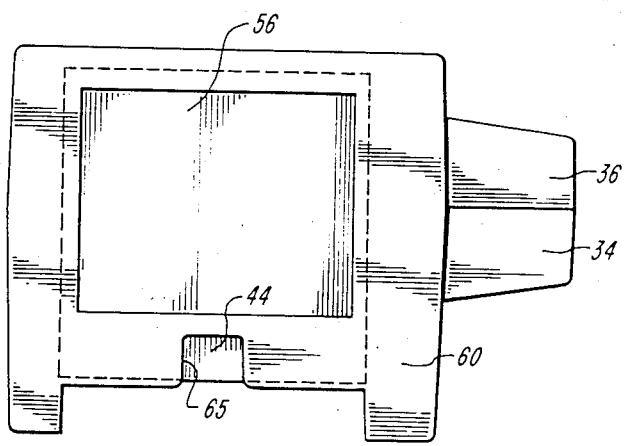

The front stand 34 defines an opening closable by a loading door 48. The loading door 48 includes a pair of opposed pintles 49 (one of which is shown) which are received by and between the front stand 34 and the base assembly 40 (FIGS. 3 and 6). The manner of connection allows the loading door 48 to move pivotally between open and closed positions; such as shown in FIGS. 1 and 2. The loading door 48 allows three-dimensional articles to be placed in the accessory 10 at an image area defined by the base assembly 40. When the loading door 48 is opened, a user can insure that the film unit and/or the other material which is to be copied are properly positioned. The door 48 includes a flexibly, resilient latch 50 which facilitates the releasable latching, Reference is made back to the base assembly 40. The base assembly 40 includes a generally planar mask 54 which is attached at respective corners to the front and back stand members 34,36. As shown in FIGS. 2 and 8, the mask 54 defines a generally rectangular opening or image area 56 and an overhanging print retaining lip 58. The lip 58 cooperates with the generally planar aluminum base 60 to form grooves 62 which slidably receive a film unit 44. In this regard, the film units 44 will slide such that their longitudinal edges cooperate with the grooves 62 formed by and between the mask 54 and the base member 60. These grooves 62 are dimensioned such that they encompass the marginal edges of each film unit. In this manner, image area of each film unit to be photographically copied is suitably positioned such that the film unit's borders are not within the image area to be copied. Furthermore, the base member 60 includes a centrally positioned finger slot 65 which facilitates insertion and removal of the film unit 44 into and from the grooves 62. The base 60 when attached by suitable means, not shown, to the mask 54 define means for properly positioning the film unit 44 in a generally planar orientation. Having the print to be copied in a planar orientation facilitates greatly the photocopying thereof.

Figure 4:
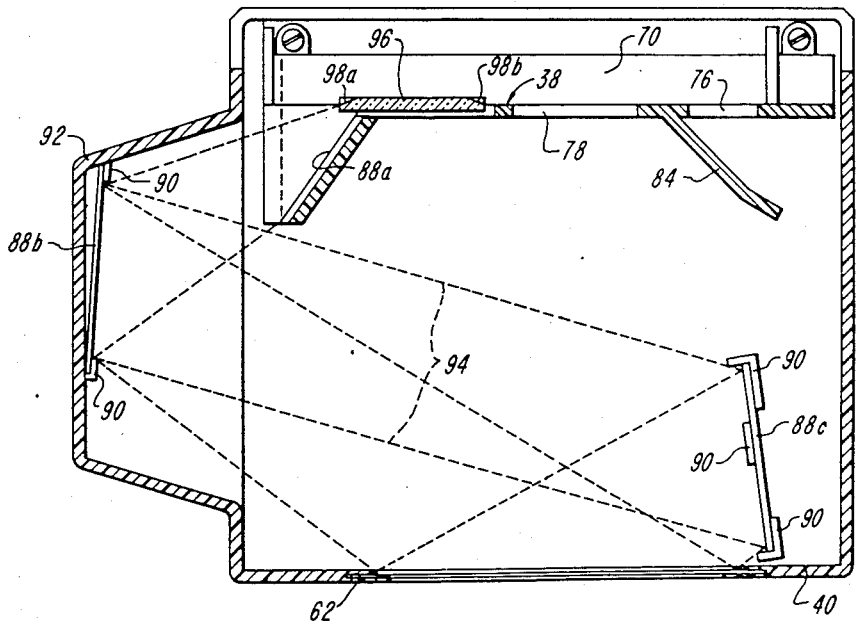
FIG. 4 is a cross-sectional view taken along section line 4-4 appearing in FIG. 3 and looking in the direction of the arrows.
Figure 5:
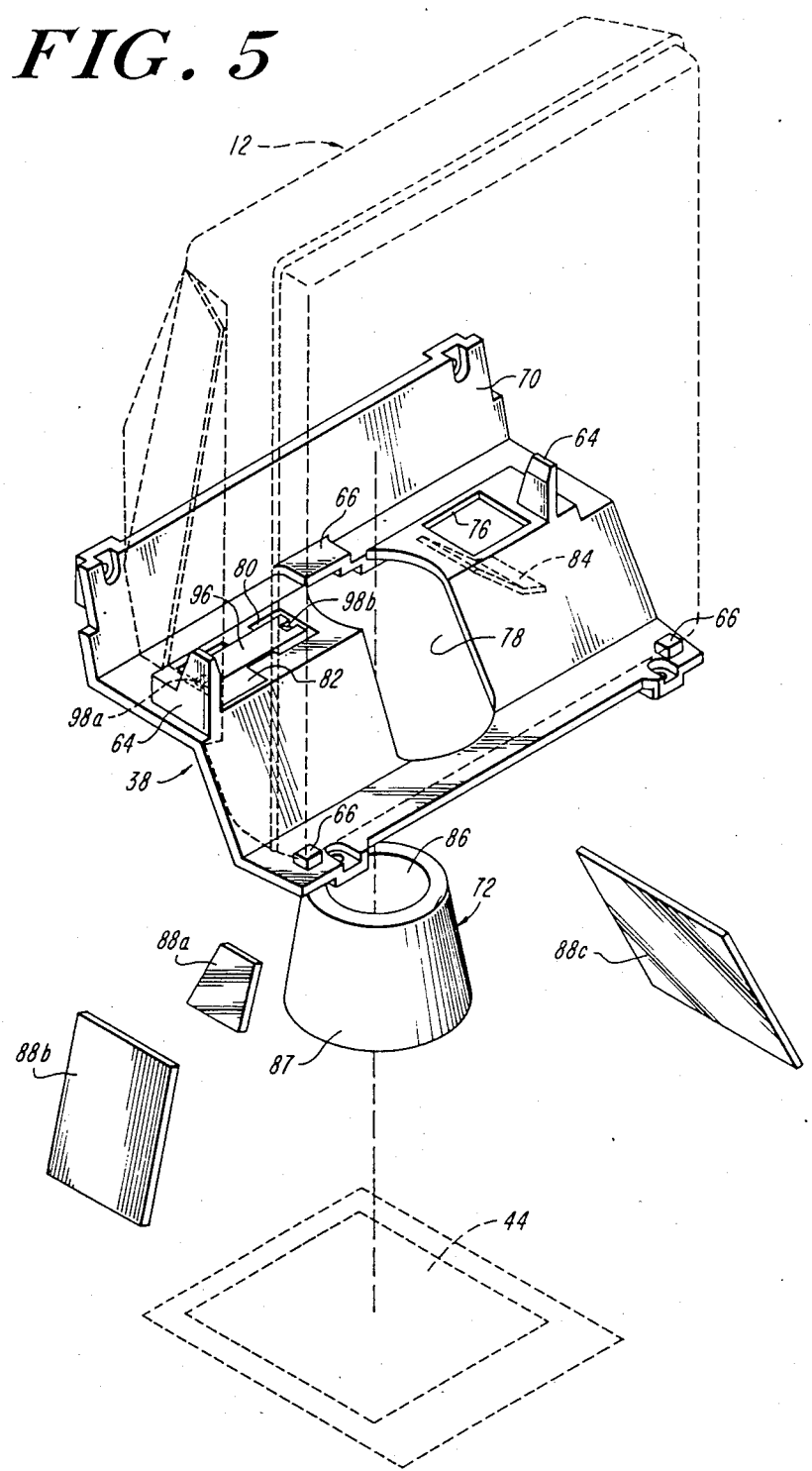
FIG. 5 is a exploded perspective view showing some components of the photographic accessory.

Reference is made now to FIGS. 2, 4 and 5 for purposes of better describing the interface plate or assembly 38. The interface plate 38 is attached, by threaded members, to the front and back stand members 34 and 36. The interface plate 38 cooperates with the camera 12 in a manner which will be described.

One important aspect of the interface plate 38 is to insure that the optical system of the self-developing camera 12 is correctly optically aligned. Towards that end, there is provided a pair of opposed and upstanding retaining fingers 64. These serve to laterally position the camera 12. Integrally formed on the interface plate 38 are mounting pads 66 which are constructed and arranged with respect to each other to properly mount and support the camera 12 in a desired stable orientation.

As best shown in FIG. 3, the top cover 42 has formed on the inside surface thereof a generally smooth and rounded camera engaging projection 68. The projection 68 is dimensioned to engage the underside surface of the camera 12 and urge the top surface of the camera into firm engagement with the inclined retaining surface 70. By inserting the camera 12 into the accessory 10 (FIGS. 2 and 5) the lateral retaining fingers 64, mounting pads 66, projection 68 and retaining surface 70 cooperatively function to insure that the optical axis of the lens assembly 26 is substantially optically coaxial with the optical axis of the lens assembly 72 of the accessory 10.

Continued reference is made to FIGS. 2, 4 and 5 for disclosing further aspects of the interface plate 38. Formed in the interface plate 38 is a transducer window opening 76, a lens assembly opening 78, a photocell window 80 and a strobe window 82. Positioned beneath the top surface of the interface plate 38 is a sonar baffle plate 84 which has the configuration depicted in FIGS. 4 and 5. The purpose of the baffle plate 84 is to redirect the path of the sonar waves emitted from the camera 12. By redirecting the sonar ranging waves, there is virtually no likelihood of damaging interference waves being established by three-dimensional objects positioned in the image area 56. Interference waves might cause the sonar rangefinder to cause the camera lens to misfocus. Although the baffle plate 84 is shown, it is to be understood that the present invention can function without such a baffle plate. Given the fact that the distance between the sonar rangefinder and the bottom of the accessory 10 is relatively small the rangefinder 24 will cause the lens system 26 to focus on its close focus position.

The lens assembly 72 is defined in this particular embodiment as a close-up type lens. In other words, the lens assembly 72 provides a slight magnification of the image area 56. Any print image in the image area 56 will be slightly enlarged at the camera focal plane. Thus, the image size-object size ratio is greater than 1. This is done for purposes of overcoming slight misalignments between the optical axes of the lens system 26 and the lens accessory assembly 72 which would result in a photocopy including more that the image area 56. Toward the end of achieving this, a close-up lens system 86 provides for the desired magnification. The close-up lens 86 is housed within a truncated lens housing 87 which is suitably secured to the interface plate 38. A portion of the lens housing 87 is accommodated by the opening 78. The optical axis of the lens assembly 72 is centered with the image area of the print to be photographed. The lens assembly 72 is sufficiently corrected for any aberrations which might occur in the kind of photocopying situation contemplated. The lens assembly 72 does not, per se, form an aspect of the present invention. Therefore, details thereof have not been set forth. However, the lens magnification is for purposes of correcting for slight misalignments of the camera lens 26 with respect to the lens assembly 72. Misalignment, of course, can arise from a number of factors including tolerance differences between cameras and accessories.

Another aspect of this invention is the illuminating means of the photographic accessory 10. The illuminating means includes a plurality of mirrors 88a,b and c.

The mirrors 88a-c are arranged with respect to each other so as to establish folded light paths by which the strobe light can be directed to the film unit 44 in a generally uniform manner.

As best seen in FIG. 4, the mirror 88a is firmly secured to an inclined surface of the interface plate 38. Attached by suitable mirror mounting pads 90 is a second mirror 88b which is housed within the handle portions 92 of the front and back stand members 34 and 36. Of course, the handle portions enhance portability of the accessory 10. The mirror 88c is positioned on the opposite side of the image area 56 and is suitably mounted by the mounting pads 90 in such an orientation that it reflects the light from mirror 88b onto the image area 56. A ray trace of the strobe light from the strobe 32 is more clearly shown by the ray tracing lines 94. The mirrors 88a-c are arranged so that they generally uniformly illuminate the area 56 by providing light from both mirrors 88b and 88c. Thus, this particular, arrangement is particularly advantageous since it only requires a single source of illumination to uniformly illuminate the print or other objects in the image area. Also, the mirrors 88a-c are area arranged such that they direct the light at relatively shallow angles to the image area 56. This is to overcome the problem of specular reflection inherent in photocopying, especially copying photographic prints having a somewhat reflective transparent layer thereover.

Reference is made to FIGS. 2, 4 and 5 for illustrating an improved optical means for enhancing exposure of the camera 12 for photocopying purposes. The optical means compensates for the fact that the automatic exposure camera 12 will be taking photographs in an otherwise compact and light-tight compartment with the photocell's field of view being obstructed partially by the lens assembly 72. Because of this obstruction, the photocell assembly 28 will sense a fraction of the light on the print. Accordingly, the exposure control system will cause the exposure interval to terminate later than would otherwise be the case. As a result, the print photograph will be overexposed, wherein the images will be burnt out.

In this embodiment, the optical means includes an optical member 96 or transparent wedge having a size and configuration, such as shown generally in the drawings. The optical member 96 is defined as a generally flat and rectangular piece of transparent plastic. At opposite ends of the member 96 is formed angled surfaces 98a,b which are respectively placed in overlying relationship to the strobe 32 and the photocell 28. The angles of the surfaces 98a, b are selected so as to effect transmission of light from surface 98a to surface 98b by means of total internal reflection. In essence, a lightpipe is created between the strobe and photocell. As noted, from the drawings, the surfaces 98a, b are laterally offset with respect to each other. This is done so that the surface 98a is in overlying relationship to the area of maximum strobe output while the other surface 98b is positioned in overlying relationship to the infrared portion of the photocell assembly 28. With camera 12, the photocell assembly 28 is responsive primarily to infrared scene radiation during strobe firing.

It will be appreciated that the amount of light transmitted to the photocell assembly 28 from the strobe 32 should be within the boundaries which are effective to provide a good exposure of the print to be copied. Although the illustrated embodiment discloses use of angled surfaces 98a, b to effect transfer of light, it is well within the spirit of the present invention to employ other approaches to simulate and/or enhance such transfer. The configuration of the optical member 96 could vary providing, of course, it transfers the requisite amount of light from the strobe to the photocell so as to achieve proper exposure.

Operation of the accessory 10 is believed obvious from the foregoing description. Such an accessory 10 facilitates the photocopying of a wide variety of subjects. For instance, the accessory 10 is especially effective in making prints of diffusion transfer photographic prints in an inexpensive and reliable manner. By lifting the cover 42 and mounting the camera 12 on the interface plate 38, the camera 12 is simply and easily converted to a photocopy camera. The accessory 10 requires no special operation or adjustment other than the previously noted mounting. Since the operator merely has to press a button on the camera 12 for effecting exposure there are no special operator steps other than the noted mounting and shooting. The construction of the accessory 10 is compact, relatively inexpensive and easily portable. Not only can the accessory 10 be used to copy photographic prints, but can copy other planar material (e.g. magazines, books, etc.) visible through the image area 56. As noted previously, three-dimensional objects, such as jewelry can be photographed when placed at the image area 56 in the exposure compartment formed inside the accessory 10.

Since certain changes may be made in the above-described accessory without departing from the scope of the invention herein involved, it is intended that all matter contained in the description or shown in the accompanying drawings shall be interpreted as illustrative and not in a limiting sense.

What is claimed is:

1. An accessory for use with a camera having a taking lens and a source of artificial illumination, said accessory comprising:
   a housing including means for positioning an article to be photographed and means for mounting the camera with its taking lens operably disposed with respect to such an article; and
   optical means for receiving light from the camera's source of artificial illumination and redirecting such light onto the article so that the article is substantially uniformly illuminated during the camera's exposure sequence, said optical means including a pair of mirrors arranged to direct the artificial illumination at relatively shallow angles to the article from opposite sides thereof so as to evenly illuminate the article and to eliminate specular reflection.

2. The accessory of claim 1 wherein said optical means additionally includes a third mirror which initially intercepts the light from the camera's source of illumination and redirects it along an optical path defined in part by said pair of mirrors.

3. An accessory for use with a camera having a taking lens, a source of artificial illumination and a photocell for receiving scene light to facilitate control of the camera's exposure sequence, said accessory comprising:
   a housing including means for positioning an article to be photographed and means for mounting the camera with its taking lens operably disposed with respect to such an article, said housing also containing structure precluding a significant portion of the light reflected from the article during an exposure sequence of the camera from being received by the camera's photocell;
   means for defining an optical path from the camera's source of artificial illumination to the article so that the article is substantially uniformly illuminated during the camera's exposure sequence; and
   optical means for intercepting a portion of the light as it emanates from the camera's source of artificial illumination during an exposure sequence and directing it directly onto the camera's photocell to supplement the light reflected from the article onto the photocell to facilitate proper exposure sequences utilizing the camera and said accessory.

4. The accessory of claim 3 wherein said optical means comprises an optical element which conducts light to the camera's photocell by the principle of total internal reflection.

5. The accessory of claim 4 wherein said housing assembly includes a handle portion which also oontains a mirror of said mirror system.

6. The accessory of claim 3 wherein said structure includes a lens assembly compactly arranged and operably disposed with respect to the taking lens and to the article.

7. An accessory for use with a photographic apparatus so as to allow such apparatus to photographically copy subjects with reflected light, wherein the photographic apparatus is of the type that includes a source of artificial illumination, a taking lens system for directing scene light to a focal plane therein and means for controlling exposure, said accessory comprising:
   a housing assembly;
   said housing assembly including means for defining an aperture at which is positioned the subject to be photographically copied;
   a lens assembly mounted on said housing assembly so that said housing assembly aperture is within the field of view thereof to provide a preselected image size ratio so that said lens assembly can properly size the image of the subject positioned at said assembly aperture to the image area of the film used in the photographic apparatus;
   said housing assembly including means for removably receiving and supporting the photographic apparatus such that the taking lens system and said lens assembly are substantially optically coaxial;
   means disposed in said housing for functionally interfacing with the exposure control means of the photographic apparatus so as to allow exposure of the subject; and means cooperable with said housing assembly and the source of artificial illumination for defining light paths such that the subject at said assembly aperture can be illuminated generally uniformly by the source of artificial illumination wherein: said lens assembly is defined by a close-up lens in which said image size-subject size ratio provides a slight degree of magnification of the subject to compensate for any preselected variation of alignment between the optical axis thereof, the optical axis of the taking lens and the subject at said assembly aperture.

8. The accessory of claim 7 wherein said means for defining light paths comprises a system of mirrors arranged with respect to each other such that illumination from the source generally uniformly illuminates said assembly aperture.

9. The accessory of claim 7 wherein said interfacing means includes means for redirecting sonar ranging energy emitted by a sonar range finding transducer provided on the apparatus so as to avoid creation of interference of the sonar ranging energy which might cause range reading misinformation.

10. The accessory of claim 7 wherein said housing assembly includes a loading door which allows three-dimensional objects to be placed at said aperture for photographic copying.

11. The accessory of claim 7 wherein said housing assembly includes means for positioning of a photographic print in a generally planar condition at said assembly aperture.

12. A photographic copying system comprising:
a photographic apparatus of the instant developing type which produces a photographic print produced by the diffusion transfer process, said apparatus having a source of artificial illumination, a taking lens system for directing scene light to a focal plane therein, and means for controlling exposure;
an accessory for use with photographic apparatus so as to allow such apparatus to photographically copy subjects with reflected light;
said accessory including a housing assembly;
said housing assembly including means for defining an aperture at which is positioned the subject to be photographically copied;
a lens assembly mounted on said housing assembly including a close-up lens so that said housing assembly aperture is within the field of view of said close-up lens and provides a preselected image size-subject size ratio;
said housing assembly including means for removably receiving and supporting the photographic apparatus such that the taking lens system and said lens assembly are substantially optically coaxial;
means disposed in said housing for functionally interfacing with the exposure control means of the photographic apparatus so as to allow exposure of the subject; and
means cooperable with said housing assembly and the source of artifical illumination of the photographic apparatus to define light paths such that the subject can be illuminated generally uniformly by the source of artificial illumination, wherein: said close-up lens provides a slight degree of magnification of the subject to compensate for any preselected variation of alignment between the optical axis thereof the optical axis of the taking lens and the subject of said assembly aperture.

13. An accessory for use with a camera having a taking lens and a source of artificial illumination, said accessory comprising:
a housing including means for positioning an article to be photographed and means for mounting the camera with its taking lens operably disposed with respect to such an article; and
optical means for receiving light from the camera's source of artificial illumination and redirecting such light onto the article so that the article is substantially uniformly illuminated during the camera's exposure sequence, said optical means including a pair of mirrors arranged to illuminate the article from opposite sides thereof wherein: said optical means additionally includes a third mirror which initially intercepts the light from the camera's source of illumination and redirects it along an optical path defined in part by said pair of mirrors; and said three mirrors are arranged such that said third mirror redirects light from the camera's source of illumination directly onto one of said pair of mirrors and said pair of mirrors are further arranged such that a portion of the light is redirected by said one mirror directly onto the article while another portion thereof is redirected by said one mirror onto the other of said pair of mirrors, said other mirror being arranged to redirect light incident thereon to the article.

14. An accessory for use with a photographic apparatus so as to allow such apparatus to photographically copy subjects with reflected light, wherein the photographic apparatus is of the type that includes a source of artificial illumination, a taking lens sytstem for directing scene light to a focal plane therein and means for controlling exposure, said accessory comprising:
a housing assembly;
said housing assembly including means for defining an aperture at which is positioned the subject to be photographically copied;
a lens assembly mounted on said housing assembly so that said assembly aperture is within the field of view thereof to provide a preselected image size-subject size ratio so that said lens assembly can properly size the image of the subject positioned at said assembly aperture to the image area of the film used in the photographic apparatus;
said housing assembly including means for removably receiving and supporting the photographic apparatus such that the taking lens system and said lens assembly are substantially optically coaxial;
means disposed in said housing for functionally interfacing with the exposure control means of the photographic apparatus so as to allow exposure of the subject; and
means cooperable with said housing assembly and the source of artificial illumination for defining light paths such that the subject at said assembly aperture can be illuminated generally uniformly by the source of artificial illumination wherein: said means for defining light paths comprises a system of mirrors arranged with respect to each other such that illumination from the source generally uniformly illuminates said assembly aperture; said lens assembly is defined by a close-up lens in which said image size-subject size ratio provides a slight degree of magnification fo the subject to compensate for any preselected variation of alignment between the optical axis thereof the optical axis of the taking lens and the subject at said assembly aperture; and said interfacing means includes optical means for diverting a portion of the illumination from the source of artificial illumination to the exposure control means so as to earlier terminate of exposure by the exposure control means.

15. The accessory of claim 14 wherein said optical means includes an optical member having surfaces in overlying relationship to the source of artificial illumination and the exposure control means wherein said surface facilitate transmission of a predetermined amount of light from the source to the exposure control means by total internal reflection.

16. An accessory for use with a photographic apparatus so as to allow such apparatus to photographically copy subjects with reflected light, wherein the photographic apparatus is of the type that includes a source of artificial illumination, a taking lens system for directing scene light to a focal plane therein and means for controlling exposure, said accessory comprising:

a housing assembly;

said housing assembly including means for defining an aperture at which is positioned the subject to be photographically copied;

a lens assembly mounted on said housing assembly so that said assembly aperture is within the field of view thereof to provide a preselected image size-subject size ratio so that said lens assembly can properly size the image of the subject positioned at said assembly aperture to the image area of the film used in the photographic apparatus;

said housing assembly including means for removably receiving and supporting the photographic apparatus such that the taking lens system and said lens assembly are substantially optically coaxial;

means disposed in said housing for functionally interfacing with the exposure control means of the photographic apparatus so as to allow exposure of the subject; and means cooperable with said housing assembly and the source of articial illumination for defining light paths such that the subject at said assembly aperture can be illuminated generally uniformly by the source of artificial illumination wherein: said lens assembly is defined by a close-up lens in which said image size-subject size ratio provides a slight ddgree of magnification of the subject to compensate for any preselected variation of alignment between the optical axis thereof the optical axis of the taking lens and the subject at said assembly aperture; and said receiving and supporting means includes a cover movable between a closed position and an open position; wherein when in said closed position said cover covers said close-up lens, said cooperable means, said functional interfacing means, said sonar ranging energy redirection means, and said receiving and supporting means; and when in said open position allows the photographic apparatus to be removably received by said receiving and supporting means, assists in properly positioning the photographic apparatus and allows ejection of a photographic print from an instant type print ejected from a photographic apparatus of the instant type.

* * * * *